(12) United States Patent
Cheng

(10) Patent No.: US 11,495,047 B2
(45) Date of Patent: Nov. 8, 2022

(54) DISPLAY MODULE, TOUCH METHOD AND TERMINAL

(71) Applicant: BEIJING XIAOMI MOBILE SOFTWARE CO., LTD., Beijing (CN)

(72) Inventor: Chihjen Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/240,309

(22) Filed: Apr. 26, 2021

(65) Prior Publication Data

US 2022/0067327 A1 Mar. 3, 2022

(30) Foreign Application Priority Data

Aug. 27, 2020 (CN) .......................... 202010880833.7

(51) Int. Cl.
*G06V 40/12* (2022.01)
*G06V 40/13* (2022.01)
*G06F 3/041* (2006.01)

(52) U.S. Cl.
CPC ........ *G06V 40/1318* (2022.01); *G06F 3/0412* (2013.01); *G06F 3/04166* (2019.05)

(58) Field of Classification Search
CPC ............ G06V 40/1318; G06F 3/04166; G06F 3/0412

See application file for complete search history.

(56) References Cited

U.S. PATENT DOCUMENTS

| 2019/0034024 A1* | 1/2019 | Park ................ G06F 3/041661 |
| 2019/0102006 A1 | 4/2019 | Suzuki et al. |
| 2021/0034189 A1 | 2/2021 | Chen et al. |
| 2021/0034833 A1* | 2/2021 | Cheng ................ G06F 3/0412 |

FOREIGN PATENT DOCUMENTS

CN 110263750 A 9/2019

OTHER PUBLICATIONS

European Patent Application No. 21171506.5, extended Search and Opinion dated Oct. 26, 2021, 8 pages.

* cited by examiner

*Primary Examiner* — Stephen G Sherman
(74) *Attorney, Agent, or Firm* — Lathrop GPM LLP

(57) ABSTRACT

A display module, a touch method and a terminal are disclosed. The display module includes: a signal reading mechanism; a fingerprint collection mechanism comprising a plurality of pixel circuits, the plurality of pixel circuits being divided into a plurality of groups, each group of pixel circuits being connected to the signal reading mechanism, a first switching unit being provided on a connection line of at least one group of pixel circuits and the signal reading mechanism; and a control mechanism respectively connected to the first switching unit and the signal reading mechanism respectively, wherein the control mechanism is configured to control at least one group of pixel circuits to be connected to the signal reading mechanism through the first switching unit, and to control the signal reading mechanism to read fingerprint signals collected by the at least one group of pixel circuits connected to the signal reading mechanism.

16 Claims, 10 Drawing Sheets

DISPLAY MODULE, TOUCH METHOD AND TERMINAL

CROSS REFERENCE TO RELATED APPLICATIONS

This application claims priority to Chinese Patent Application No. 202010880833.7, filed on Aug. 27, 2020, the content of which is incorporated herein by reference in its entirety.

TECHNICAL FIELD

The present disclosure relates to a field of terminal equipment technology, and particularly to a display module, a touch method, a touch apparatus, an electronic device and a storage medium.

BACKGROUND

With the rapid development of the display screen technology, an infinity display is increasingly favored by users. In order to meet the needs of users, a plurality of solutions for increasing a screen-to-body ratio have been proposed. For example, an optical fingerprint detection module can be arranged under the screen to achieve the under-screen fingerprint detection technology. The optical fingerprint module can collect the light reflected by fingers and perform a fingerprint recognition. However, due to increase in screen size and improvement of fingerprint accuracy, the required number of channels or units for reading the signals has increased, which results in increased chip area requirement and more power consumption.

SUMMARY

According to a first aspect of embodiments of the present disclosure, a display module applicable to a terminal is provided. The display module may include: a signal reading mechanism; a fingerprint collection mechanism comprising a plurality of pixel circuits, the plurality of pixel circuits being divided into a plurality of groups, each group of pixel circuits being connected to the signal reading mechanism, a first switching unit being provided on a connection line of at least one group of pixel circuits and the signal reading mechanism; and a control mechanism respectively connected to the first switching unit and the signal reading mechanism respectively, wherein the control mechanism is configured to control at least one group of pixel circuits to be connected to the signal reading mechanism through the first switching unit, and to control the signal reading mechanism to read fingerprint signals collected by at least one group of pixel circuits connected to the signal reading mechanism.

According to a second aspect of embodiments of the present disclosure, a touch method applicable to a display module is provided. The display module includes a signal reading mechanism and is divided into at least one zone. The touch method includes: obtaining a touch position; controlling at least one group of pixel circuits corresponding to the touch position to be connected to the signal reading mechanism; and controlling the signal reading mechanism to read fingerprint signals collected by the at least one group of pixel circuits connected to the signal reading mechanism.

According to a third aspect of embodiments of the present disclosure, a terminal is provided. The terminal may include a display module, a processor and a memory. The display module may include a signal reading mechanism and may be divided into at least one zone. The memory may be configured to store computer instructions executable by the processor. The processor may be configured to: obtain a touch position; control at least one group of pixel circuits corresponding to the touch position to be connected to the signal reading mechanism; and control the signal reading mechanism to read fingerprint signals collected by the at least one group of pixel circuits connected to the signal reading mechanism.

BRIEF DESCRIPTION OF THE DRAWINGS

The accompanying drawings, which are incorporated into and constitute a part of this specification, illustrate embodiments consistent with the present disclosure and serve to explain the principles of the present disclosure together with the specification.

DETAILED DESCRIPTION

Exemplary embodiments will be described in detail below, examples of which are illustrated in the accompanying drawings. When the following description refers to the accompanying drawings, unless otherwise indicated, the same numbers in different drawings represent the same or similar elements. The implementation described in the following exemplary embodiments do not represent all implementation consistent with the present disclosure. On the contrary, they are only examples of apparatuses and methods consistent with some aspects of the present disclosure.

The terms in the present disclosure are only for the purpose of describing specific embodiments, and are not intended to limit the present disclosure. The singular forms "a", "said" and "the" in the present disclosure and appended claims are also intended to include plural forms, unless the context clearly indicates other meanings. It is to be understood that the term "and/or" used herein refers to and includes any or all possible combinations of one or more associated listed items.

It is to be understood that although the terms first, second, third, etc. may be adopted in the disclosure to describe various information, the information should not be limited to these terms. These terms are only used to distinguish the same type of information from each other. For example, without departing from the scope of the present disclosure, first information may also be referred to as second information, and similarly, the second information may also be referred to as the first information. Depending on the context, the word "if" as used herein can be interpreted as "when . . . ", "upon . . . " or "in response to determine . . . ".

Figure 1:
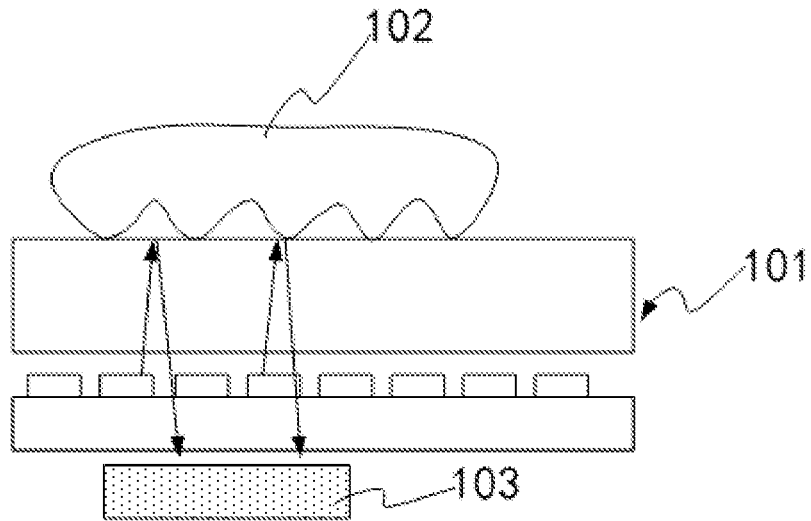
FIG. 1 is an application scenario illustrating a display screen according to an exemplary embodiment.
Figure 2:
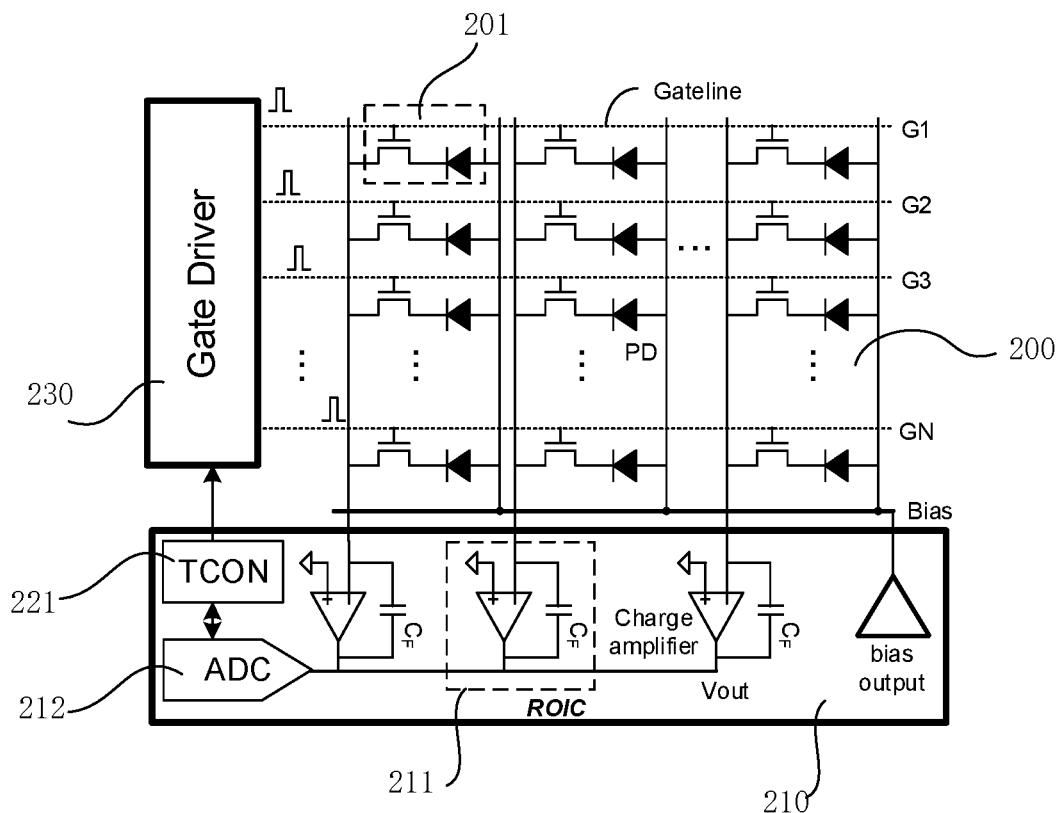
FIG. 2 is a local circuit diagram illustrating a display screen according to an exemplary embodiment.
Figure 3:
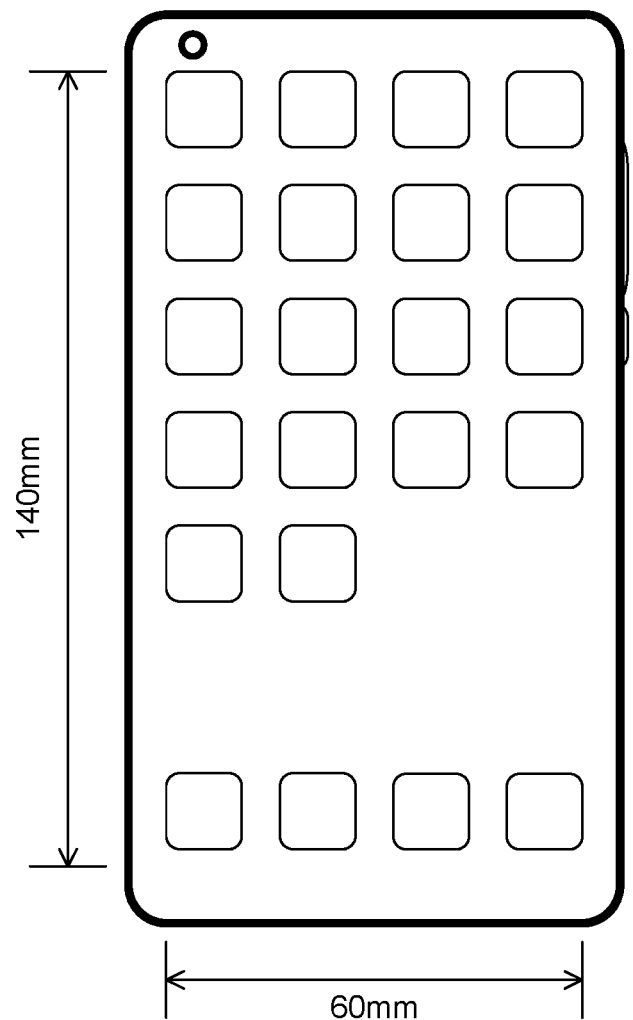
FIG. 3 is a diagram illustrating a size of a display screen according to an exemplary embodiment.

Specifically, referring to FIG. 1, it illustrates an application scenario of a display screen. The organic light emitting diode (OLED) display screen 101 includes a front and a back. The front is used to be touched by a finger 102, and an optical fingerprint module 103 is provided on the back. After the self-luminous light in the OLED display screen hits the finger and is reflected back to the optical fingerprint module 103, the under-screen fingerprint detection can be thus realized. Referring further to FIG. 2, which exemplarily illustrates a local circuit diagram of a display screen. It can be seen from FIG. 2 that each column of a pixel circuit 201 of a fingerprint collection mechanism 200 is connected to a signal reading unit 211 of a signal reading mechanism 210. That is, each signal reading unit 211 is configured to correspondingly read a fixed column of the pixel circuit 201. In other words, it is necessary that the number of signal reading units 211 may be correspondingly arranged for the number of columns of pixel circuit 201, in which each signal reading unit 211 can be regarded as a signal channel. Thus, the signal channels are caused to increase. For example, as illustrated in the 140 mm×60 mm display screen of FIG. 3, when all icons are covered and the fingerprint accuracy is 508 dpi, 1200 channels are needed, even though the fingerprint accuracy is 300 dpi, 705 channels are also needed. The chip area will be thus very large, and the power consumption will be high. In addition, FIG. 2 also illustrates an analog-to-digital converter 211 of the signal reading mechanism 210, a timer control register 221 of the controller, and a driving mechanism 230, which will be elaborated in detail below and will not be specifically described here.

Figure 4:
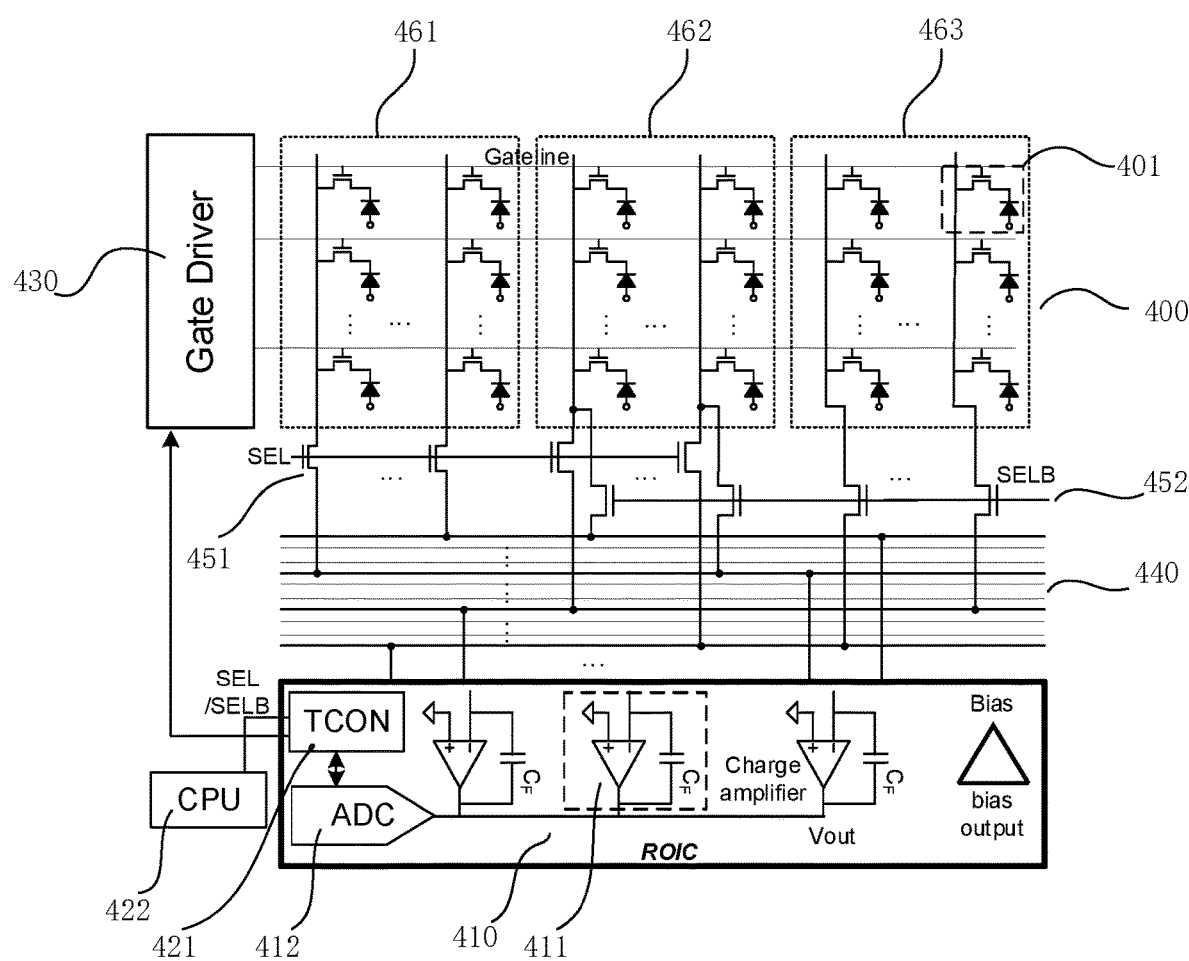
FIG. 4 is a structural schematic diagram illustrating a display module according to an exemplary embodiment.

In the first aspect, at least one embodiment of the present disclosure provides a display module, which is applicable to a terminal equipment. Referring to FIG. 4, it illustrates the schematic diagram of the display module. The display module includes a fingerprint collection mechanism 400, a signal reading mechanism 410 and a control mechanism. The fingerprint collection mechanism 400 includes a plurality of pixel circuits 401. The plurality of pixel circuits 401 are divided into a plurality of groups. Each group of pixel circuits 401 is connected to the signal reading mechanism 410. A first switching unit is provided on a connection line of at least one group of pixel circuits 401 and the signal reading mechanism 410.

The plurality of pixel circuits 401 of the fingerprint collection mechanism 400 are provided over the entire display module, and the plurality of pixel circuits 401 of the fingerprint collection mechanism 400 are arranged in a plurality of rows and a plurality of columns, in which each column of pixel circuit 401 forms a group of pixel circuits.

The control mechanism is respectively connected to the first switching unit and the signal reading mechanism 410. The control mechanism is configured to control at least one group of pixel circuits 401 to be connected to the signal reading mechanism 410 through the first switching unit, and to control the signal reading mechanism 410 to read fingerprint signals collected by the pixel circuit 401 that is connected to the signal reading mechanism 410.

The control mechanism may include a central processing unit (CPU) 422 and a timer control register (TCON) 421, in which the timer control register 421 and the signal reading module 410 may be integrated into one chip. When the control mechanism performs specific controls, the central processing unit 422 may generate instructions and transmit the instructions to the timer control register 421. The timer control register 421 then controls the first switching unit to switch on or off according to the instructions, that is, selects part or all of the first switching units to switch on. In addition, the signals read by the signal reading mechanism 410 will be uploaded to the timer control register 421 and further reported to the CPU 421, so that the CPU 421 can process the signals that have been read.

In the display module applicable to a terminal equipment according to the present disclosure, a fingerprint collection mechanism having a plurality of pixel circuits may be arranged to collect fingerprint signals by the plurality of pixel circuits, and the plurality of pixel circuits are connected to the signal reading mechanism after being divided into a plurality of groups, so that the signal reading mechanism is enabled to read the fingerprint signals collected by each group of pixel circuits. In addition, a first switching unit is arranged on the connection line of at least one group of pixel circuits and the signal reading mechanism, then the control mechanism can select at least one group of pixel circuits to be connected to the signal reading mechanism by controlling the first switching unit, and the signal reading mechanism can only read fingerprint signals collected by the pixel circuits connected to it. Therefore, the signal reading mechanism can read the fingerprint signals collected by part of the pixel circuits each time. For example, it can only read the fingerprint signals collected by the pixel circuits within the touch range of the fingerprint. Under the premise of ensuring the accuracy of the fingerprint, the number of channels or units of the signal reading mechanism are reduced, thereby decreasing area and power consumption of the chip.

Referring again to FIG. 4, in some embodiments of the present disclosure, the signal reading mechanism 410 includes a plurality of signal reading units 411, in which each signal reading unit 411 is connected to a common communication bus 440, and each common communication bus 440 is connected to at least one group of pixel circuits 401; the control mechanism is configured to control each common communication bus 440 to be connected to a group of pixel circuits 401 through the first switching unit, and to control the signal reading unit 411 to read the fingerprint signals collected by the group of pixel circuits 401 connected to the corresponding common communication bus 440. FIG. 4 is just for illustration, and is not drawn strictly according to the quantitative correspondence of each part, which is not a restriction on the quantitative correspondence of each part.

Each signal reading unit 411 is configured to read fingerprint signals collected by a group of pixel circuits 401 (for example, a column of pixel circuits 401), and the group number of pixel circuits 401 (for example, the column number of pixel circuits 401) can be set more than the number of signal reading units 411. Then a part of pixel circuits 401 can be selected for reading each time, so as to avoid the increase in the chip area and the power consumption caused by arranging a signal reading unit 411 for each group of pixel circuits 401. The common communication bus 440 facilitates the selective connection of pixel circuits 401 and signal reading mechanism 410. Since each common communication bus 440 is connected to one signal reading unit 411, each signal reading unit 411 is responsible for reading one or more groups (for example, one type of or a plurality of columns) of pixel circuits 401, which facilitates the connection to the common communication bus 440. When a group of pixel circuits 401 are connected to a common communication bus 440, a first switching unit can be provided on the connection line of the group of pixel circuits 401 and the common communication bus 440, so that the signal reading unit 411 can read (that is, the corresponding first switching unit is switched on) or does not read (that is, the corresponding first switching unit is switched off) the fingerprint signals collected by the corresponding group of pixel circuits 401. In one aspect, a first switching unit may not be provided, the signal reading unit 411 may always read the corresponding group of pixel circuits 401. When a plurality of groups of pixel circuits 401 are connected to a common communication bus 440, a first switching unit may be provided on the connection line of a plurality of groups of pixel circuits 401 and the common communication bus 440, and one group of first switching units are selected to be on each time while other groups of first switching units are off, so as to selectively read one group of the pixel circuits 401.

In some embodiments of the present disclosure, the display module comprises a plurality of zones continuously arranged in a preset direction, in which each zone corresponds to a multi-column pixel circuit; and the control mechanism is configured to control a multi-column pixel circuit corresponding to at least one zone of the plurality of zones to be connected to the signal reading mechanism through the first switching unit.

Referring to FIG. 4, in an embodiment, the display module comprises a first zone 461, a second zone 462, and a third zone 463 continuously arranged in a preset direction, in which each of the first zone 461, the second zone 462 and the third zone 463 corresponds to a multi-column pixel circuit 401; and the control mechanism is configured to control the pixel collection mechanism 400 to be in a first state or a second state through the first switching unit. In the first state, the multi-column pixel circuits 401 corresponding to the first zone 461 and the second zone 462 are connected to the signal reading mechanism 410. In the second state, the multi-column pixel circuits 401 corresponding to the second zone 462 and the third zone 463 are connected to the signal reading mechanism 410.

Referring again to FIG. 4, a multi-column pixel circuit 401 in the first zone 461 is connected to a first part of (a plurality of) common communication buses 440, and a first switching unit SEL451 is arranged on a connection line of each column of pixel circuits 401 and the common communication bus 440. A multi-column pixel circuit 401 in the third zone 463 is connected to the second part of (a plurality of) common communication buses 440, and a first switching unit SELB452 is arranged on a connection line of each column of pixel circuits 401 and the common communication bus 440.

When the first zone 461, the second zone 462 and the third zone 463 correspond to a same column number of pixel circuits 401, the multi-column pixel circuit in the first zone 461 is firstly connected to the first part of (the plurality of) common communication buses 440, and a first switching unit SEL451 is arranged on the connection line of each column of pixel circuits 401 and the common communication bus 440. At the same time, the multi-column pixel circuit in the second zone 462 is also connected to the second part of (the plurality of) common communication buses 440 and a first switching unit SELB452 is arranged on a connection line of each column of pixel circuits 401 and the common communication bus 440. In the second zone 462, the control mechanism can uniformly control first switching units SEL451 to switch on or off, and can also uniformly control first switching units SELB452 to switch on or off In other words, the control mechanism can select one of the first switching units SEL451 and the first switching units SELB452 for connection.

When the column number of the multi-column pixel circuit 401 corresponding to the second zone 462 is greater than the column number of the multi-column pixel circuit 401 corresponding to the first zone 461, and the column number of the multi-column pixel circuit 401 corresponding to the first zone 461 is equal to the column number of the multi-column pixel circuit 401 corresponding to the third zone 463, then the multi-column pixel circuit 401 in the second zone 462 is divided into two parts. One part of the multi-column pixel circuit is connected to a third part of (a plurality of) common communication buses 440, and no switching unit is arranged on the connection line of each column of pixel circuits 401 and the common communication bus 440. The other part of the multi-column pixel circuit is firstly connected to the first part of (the plurality of) common communication buses 440, and a first switching unit SEL451 is arranged on the connection line of each column of pixel circuits 401 and the common communication bus 440; at the same time, the other part of the multi-column pixel circuit is also connected to the second part of (the plurality of) common communication buses 440, and a first switching unit SELB452 is arranged on a connection line of each column of pixel circuits 401 and the common communication bus 440. In the other part of the multi-column pixel circuit corresponding to the second zone 462, the control mechanism can uniformly control the first switching units SEL451 to switch on or off, and can also uniformly control the first switching units SELB452 to switch on or off In other words, the control mechanism can select one of the first switching units SEL451 and the first switching units SELB452 for connection. Specially, when all the first switching units SEL451 are on and all the first switching units SELB452 are off, the fingerprint collection mechanism 400 is in the first state. When all the first switching units SEL451 are off and all the first switching units SELB452 are on, the fingerprint collection mechanism 400 is in the second state.

Figure 14:
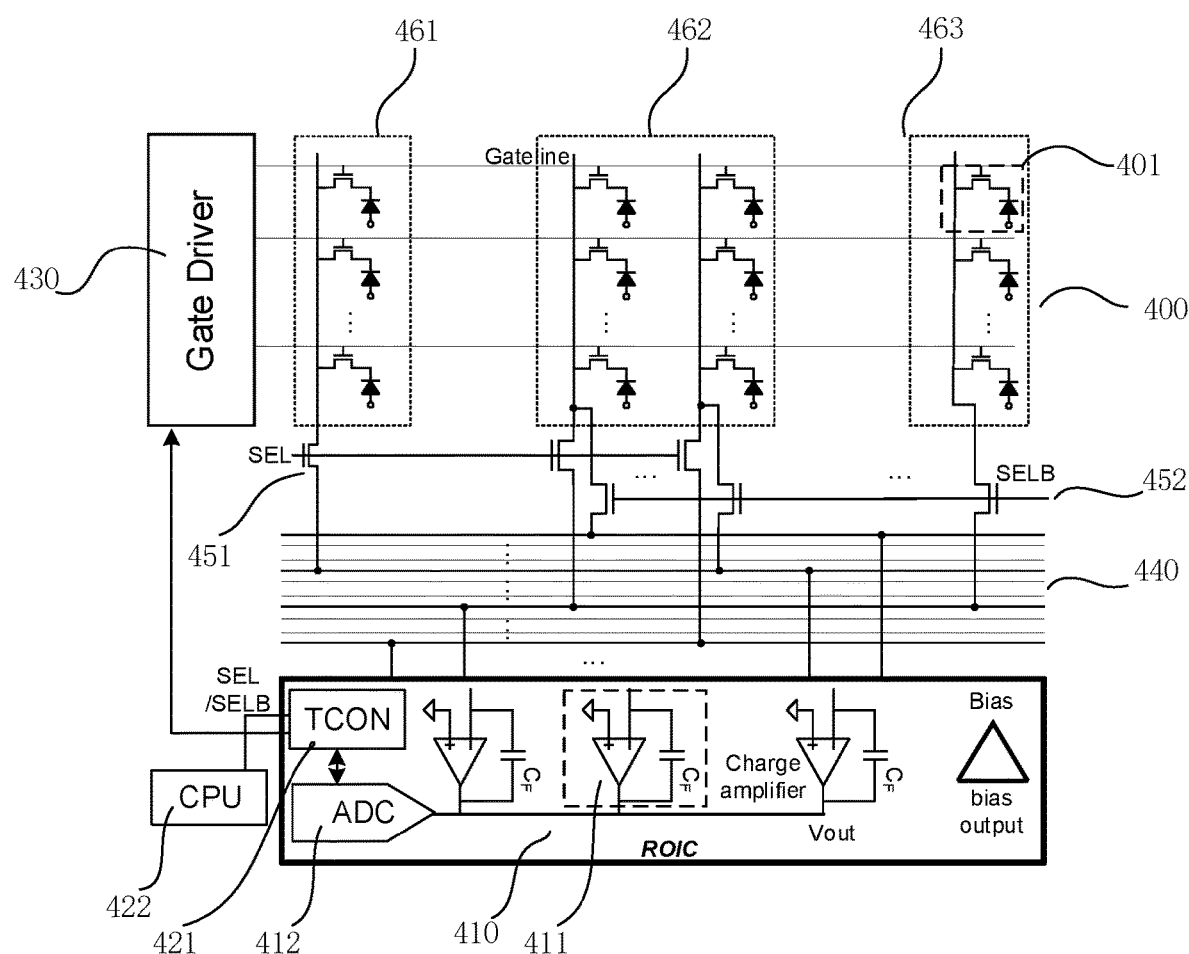
FIG. 14 is a structural schematic diagram illustrating another embodiment of the display module of FIG. 4.

Referring to FIG. 4, it illustrates that a column number of the multi-column pixel circuit corresponding to the first zone 461=a column number of the multi-column pixel circuit corresponding to the second zone 462=a column number of the multi-column pixel circuit corresponding to the third zone 463. FIG. 14 illustrates another version of FIG. 4 with reduced column numbers corresponding to the first zone 461 and the third zone 463.

Figure 5:
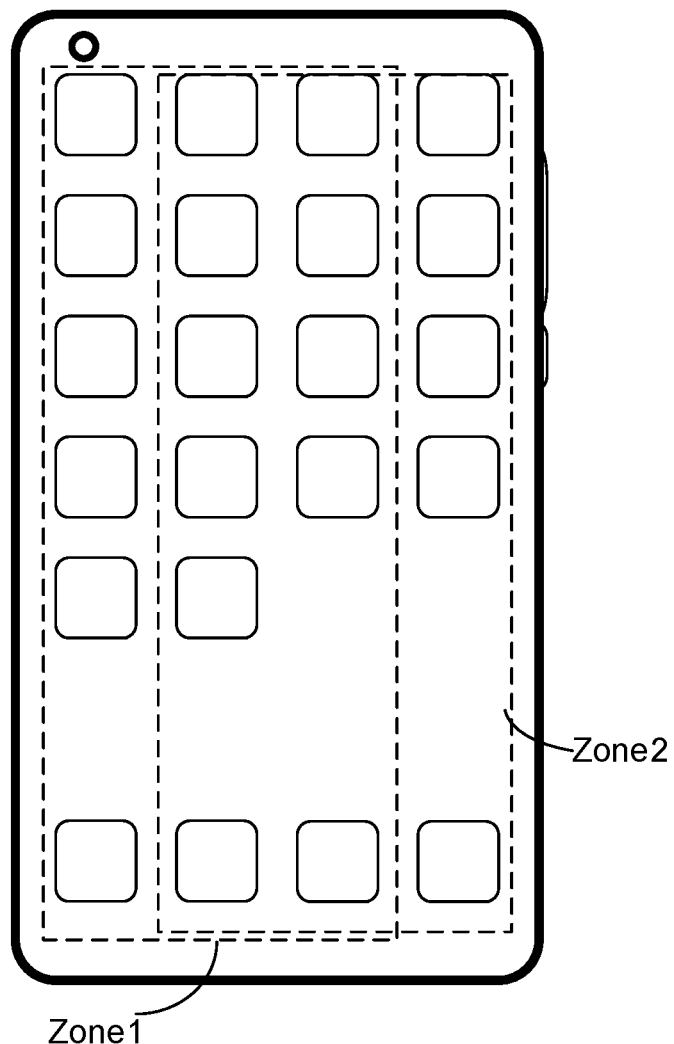
FIG. 5 is a schematic diagram illustrating a touch zone distribution mode of a display module according to an exemplary embodiment.

Referring to FIG. 5, it illustrates two touch zones of the display module corresponding to the two states realized by the partitioned mode illustrated in the FIG. 4, that is, when the fingerprint collection mechanism is in the first state, the touch zone of the display module is Zone 1, and when the fingerprint collection mechanism is in the second state, the touch zone of the display module is Zone 2. Since the touch zones Zone 1 and Zone 2 have an overlap zone, no matter where the user touches the display module, the fingerprint signal collection can be completed by selecting one of the first state and the second state in which the fingerprint collection mechanism is operated, so as to avoid the situation where the fingerprint signal collection can be completed only when the fingerprint collection mechanism is enabled to be in two states corresponding to the two touch zones in turn if the touch position spans across two non-overlap touch zones (e.g., the distribution mode illustrated in FIG. 8), which improves the efficiency and accuracy of the collection of fingerprint signals. Similarly, since the touch zones of Zone 1 and Zone 2 have the overlap zone, a touch zone responsible for response may be determined according to the user's touch position (that is, the state of the fingerprint collection mechanism is determined) in the following way: the display module is equally divided into two parts (i.e., the left part and the right part), that is, an invisible boundary line is set in a center of the display module, in which the left to the boundary line is one part and the right to the boundary line is the other part; when the user's touch position is in the left part, Zone 1 is determined as the zone responsible for the response, that is, the state of the fingerprint collection mechanism is determined to be in the first state; when the user's touch position is in the right part, Zone 2 is determined as the zone responsible for the response, that is, the state of the fingerprint collection mechanism is determined to be in the second state; when the user's touch position spans across the above boundary line, Zone 1 or Zone 2 can be randomly determined as the zone responsible for the response, and the fingerprint collection mechanism can be also determined to be in the corresponding state, or a default response zone at this situation can be set, that is, Zone 1 or Zone 2 is set as the default response zone, then the default response zone is determined as the zone responsible for the response at this time, and the fingerprint collection organization is also determined to be in the corresponding state. The touch zone responsible for the response can be also determined in the following way, including: setting the priority of Zone 1 and Zone 2, and determining the touch zone responsible for the response according to the touch position. When the touch position is covered by the touch zone with a high priority, then the response may be made for the touch zone and the fingerprint collection mechanism may be determined to be in the corresponding state. When the touch position is not covered by the touch zone with the high priority, the response may be made for the touch zone with a low priority and the fingerprint collection mechanism may be determined to be in the corresponding state.

Figure 6:
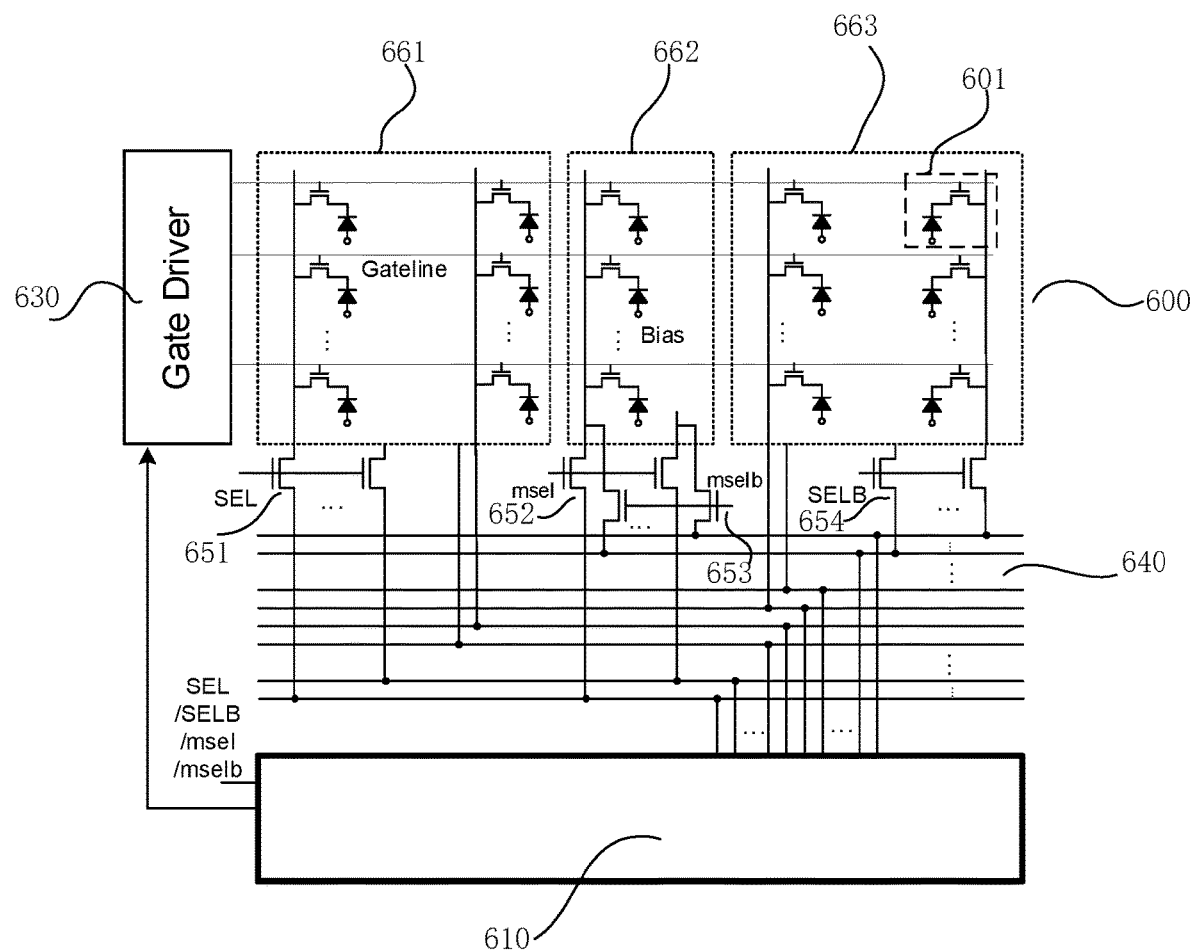
FIG. 6 is a structural schematic diagram illustrating a display module according to another exemplary embodiment.

Referring to FIG. 6, in an embodiment, the display module includes a fourth zone 661, a fifth zone 662, and a sixth zone 663 continuously arranged in a preset direction. Each of the fourth zone 661, the fifth zone 662 and the sixth zone 663 corresponds to a multi-column pixel circuit 601. The fourth zone 661 includes a first partition (the part where the switching circuit is provided in FIG. 6) and a second partition (the part where the switching circuit is not provided in FIG. 6) continuously arranged in a preset direction. The sixth zone 663 includes a third partition (the part where the switching circuit is not provided in FIG. 6) and a fourth partition (the part where the switching circuit is provided in FIG. 6) continuously arranged in a preset direction. The control mechanism is configured to control the pixel collection mechanism 600 to be in a third state, a fourth state or a fifth state through the first switching unit. In the third state, the multi-column pixel circuits 601 corresponding to the first partition and the fourth partition are connected to the signal reading mechanism 610. In the fourth state, the multi-column pixel circuits 601 corresponding to the first partition and the fifth zone 662 are connected to the signal reading mechanism 610. In the fifth state, the multi-column pixel circuits 601 corresponding to the fifth zone 662 and the fourth partition are connected to the signal reading mechanism 610.

Referring again to FIG. 6, a column number of the multi-column pixel circuit 601 corresponding to the first partition is equal to a column number of the multi-column pixel circuit corresponding to the fifth zone 662, and the column number of the multi-column pixel circuit corresponding to the fifth zone 662 is equal to a column number of the multi-column pixel circuit 601 corresponding to the fourth partition.

Referring again to FIG. 6, the multi-column pixel circuit 601 in the first partition is connected to a first part of (a plurality of) common communication buses 640, and a first switching unit SEL651 is arranged on the connection line of each column of pixel circuits 601 and the common communication bus 640. The multi-column pixel circuit 601 in the second partition is connected to a second part of (a plurality of) common communication buses 640, and no switching unit is arranged on the connection line of each column of pixel circuits 601 and the common communication bus 640. The multi-column pixel circuit in the fifth zone 662 is firstly connected to the first part of (the plurality of) common communication buses 640, and a first switching unit mesl652 is arranged on the connection line of each column of pixel circuits 601 and the common communication bus 640; and the multi-column pixel circuit in the fifth zone 662 is simultaneously connected to the third part of (the plurality of) common communication buses 640, and a first switching unit mselb653 is arranged on the connection line of each column of pixel circuits 601 and the common communication bus 640. The multi-column pixel circuit 601 in the third partition is connected to a fourth part of (a plurality of) common communication buses 640, and no switching unit is arranged on the connection line of each column of pixel circuits 601 and the common communication bus 640; and the multi-column pixel circuit 601 in the fourth partition is connected to the third part of (the plurality of) common communication buses 640, and a first switching unit SELB654 is arranged on the connection line of each column of pixel circuits 601 and the common communication bus 640. The control mechanism can uniformly control the first switching units SEL651 to switch on or off, can also uniformly control the first switching units msel652 to switch on or off, can also uniformly control the first switching units mselb653 to switch on or off, and can also uniformly control the first switching units SELB654 to switch on or off. In other words, the control mechanism can select at least one of the first switching units SEL651, the first switching units msel652, the first switching units mselb653, and the first switching units SELB654 for connection. Specifically, when all the first switching units SEL651 and all the first switching units SELB654 are on, and all the first switching circuits msel652 and all the first switching circuits mselb653 are off, the fingerprint collection mechanism 600 is in the third state; when all the first switching units SEL651 and all the first switching circuits mselb653 are on, and all the first switching circuits msel652 and all the first switching units SELB654 are off, the fingerprint collection mechanism 400 is in the fourth state; when all the first switching units SEL651 and all the first switching circuits mselb653 are off, and all the first switching circuits msel652 and all the first switching units SELB654 are on, the fingerprint collection mechanism 600 is in the fifth state.

Figure 7:
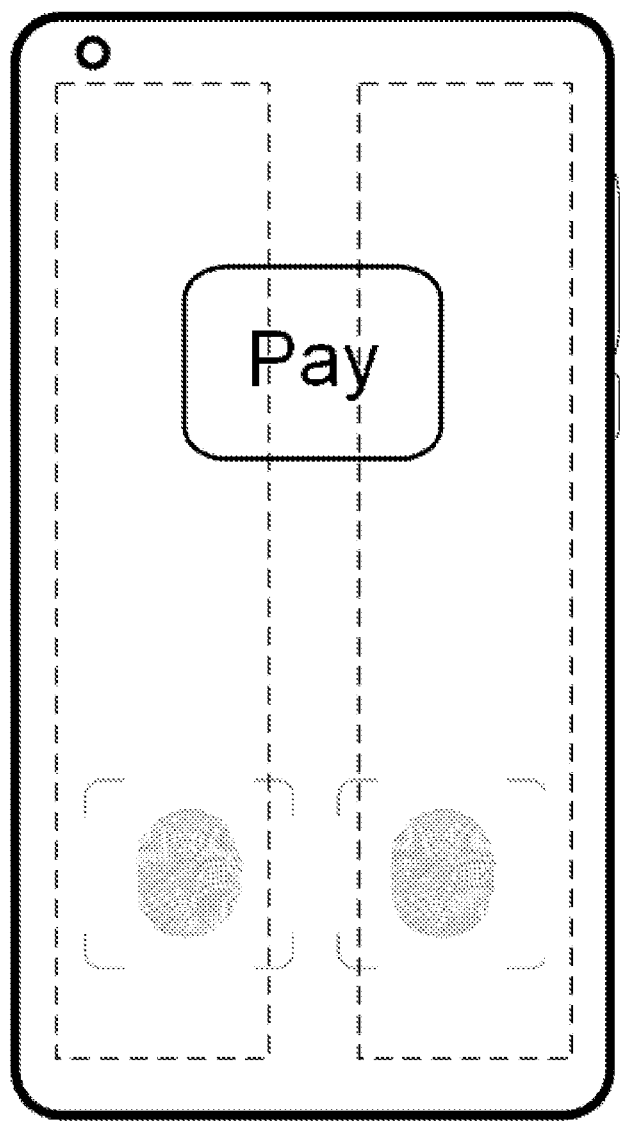
FIG. 7 is a schematic diagram illustrating a touch zone distribution mode of a display module according to another exemplary embodiment.

Referring to FIG. 7, it illustrates two touch zones (two zones where the finger is located) of the display module corresponding to the three states realized by the partitioned mode illustrated in FIG. 6.

In an embodiment, the display module includes a seventh zone and an eighth zone continuously arranged in a preset direction, and each of the seventh zone and the eighth zone corresponds to a multi-column pixel circuit; and the control mechanism is configured to control a multi-column pixel circuit corresponding to the seventh zone or a multi-column pixel circuit corresponding to the eighth zone to be connected to the signal reading mechanism through the first switching unit.

A column number of the multi-column pixel circuit corresponding to the seventh zone is equal to a column number of the multi-column pixel circuit corresponding to the eighth zone.

Figure 8:
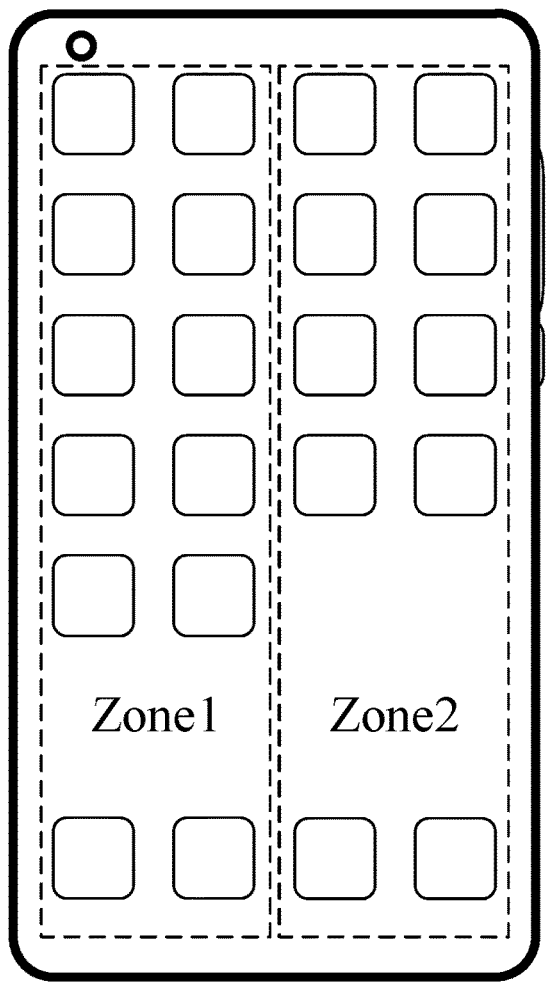
FIG. 8 is a schematic diagram illustrating a touch zone distribution mode of a display module according to yet another exemplary embodiment.

Referring to the FIG. 8, it illustrates two touch zones of the display module corresponding to the two states realized by the partitioned mode illustrated in the above embodiment, that is, when the multi-column pixel circuit corresponding to the seventh zone is connected to the signal reading mechanism, the touch zone of the display module is Zone 1; when the multi-column pixel circuit corresponding to the eighth zone is connected to the signal reading mechanism, the touch zone of the display module is Zone 2.

Referring again to FIG. 4, in some embodiments of the present disclosure, a driving mechanism 430 is further included, and the driving mechanism includes a plurality of driving units; the pixel circuit 401 includes a photoelectric conversion unit and a second switching unit, in which the photoelectric conversion unit is connected to a bias voltage, and a first end and a second end of the second switching unit are respectively connected to the photoelectric conversion unit and the signal reading unit; and each driving unit is connected to a third end of the second switching unit of a row of pixel units and configured to control the corresponding second switching unit to switch on or off.

Since the method for reading the pixel circuit is in a row-by-row reading, the driving mechanism 430 turns on the second switching unit for each row of pixel circuits 401 sequentially through each driving unit row by row. When the second switching unit for one row of pixel circuits 401 is on while the second switching units for other rows of pixel circuits 401 are off, the signal reading mechanism 410 reads fingerprint signals collected by each column of pixel circuits 401 sequentially through each signal reading unit 411 row by row. In other words, since only the second switching unit for one row of pixel circuits 401 is on, the signal reading mechanism 410 reads the fingerprint signals collected by each pixel circuit 401 one by one.

Figure 9:
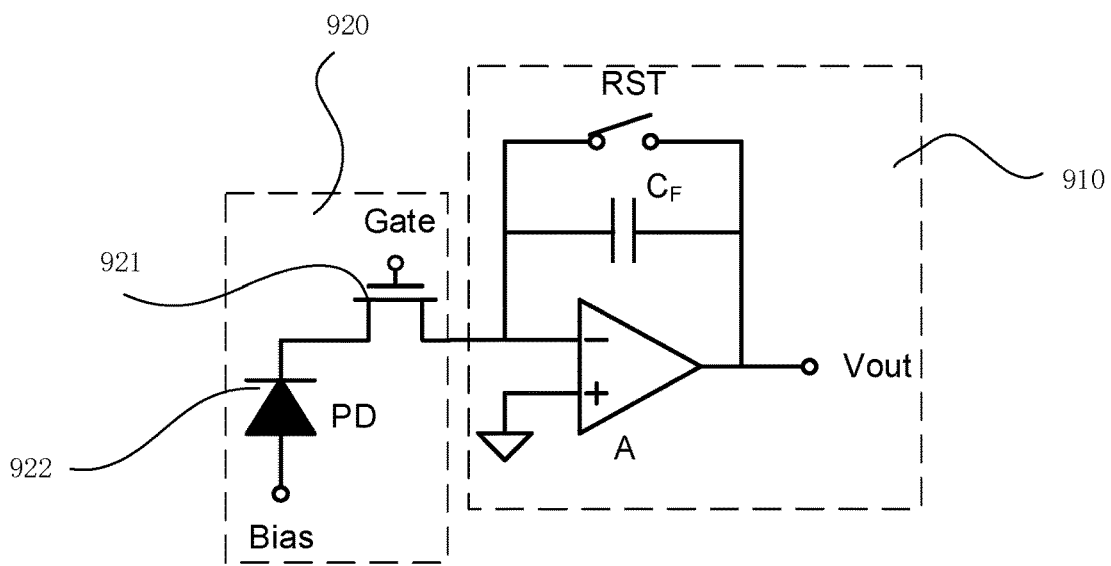
FIG. 9 is a schematic diagram illustrating the connection between a pixel circuit and a signal reading mechanism according to an exemplary embodiment.

Referring to FIG. 9, it exemplarily illustrates a circuit diagram of a pixel circuit connected to a corresponding signal reading unit when reading the fingerprint signal collected by a pixel circuit. The signal reading unit 910 includes: an operational amplifier A, a feedback capacitor CF and a reset switch RST. The operational amplifier A includes: a first input terminal, a second input terminal and an output terminal. The first input terminal is connected to the photoelectric conversion unit 922 through the second switching unit 921 of the pixel circuit 920, and the second input terminal is connected to a reference voltage terminal. The feedback capacitor CF is connected in parallel between the first input terminal and the output terminal, and the reset switch RST is also connected in parallel between the first input terminal and the output terminal. Exemplarily, the first input terminal is a negative phase input terminal, and the second input terminal is a positive phase input terminal. Taking the photoelectric conversion unit 922 being a photosensitive diode PD as an example, the photocurrent generated by the photosensitive diode PD will flow back to the bias voltage line (Bias), and the potential of the anode of the photosensitive diode PD will decrease, which causes the output terminal of the operational amplifier A to supplement the current through the CF. According to the charge Q=CF× $V_{OUT}$, the charge accumulation in the CF may not be too fast by increasing the CF, so that the $V_{OUT}$ at the output terminal of the operational amplifier A may not be easily increased to exceed the voltage load of the operational amplifier A, which is beneficial for the signal reading unit 910 to read fingerprint signals collected by a larger number of fingerprint pixel circuits 920 at one time.

Figure 10:
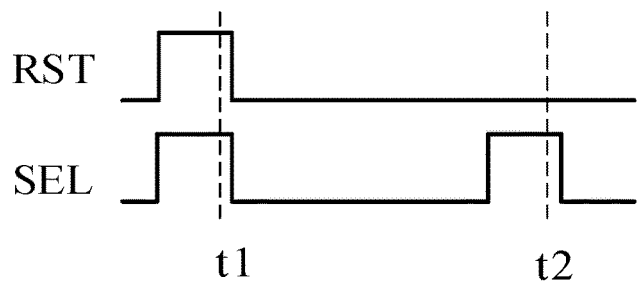
FIG. 10 is a working sequence diagram illustrating a pixel circuit according to an exemplary embodiment.

FIG. 10 is a working sequence diagram illustrating a pixel circuit according to an exemplary embodiment. Firstly, the PD is reset through the operational amplifier (the reset process is also performed in a row-by-row form). At the same time, the $V_{OUT}$ is read at $t_1$ to be a value of $V_{out1}$. After a period of light signal accumulation and the second switching circuit SEL (gateline) is switched on, the $V_{OUT}$ is read at $t_2$ to be a value of $V_{out2}$ from the row that was reset at the beginning. Then the two values are subtracted to get a signal change.

Figure 11:
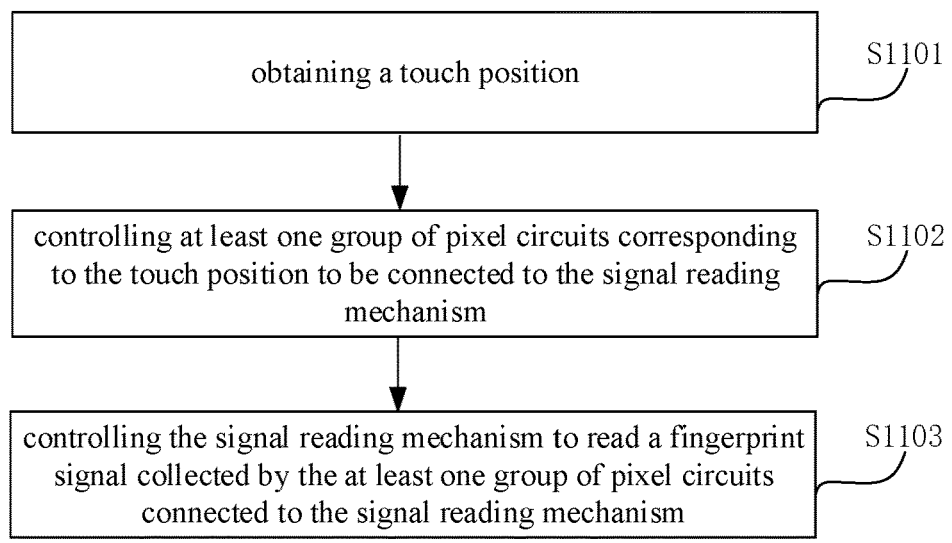
FIG. 11 is a flow chart illustrating a touch method according to an exemplary embodiment.

According to a second aspect of the embodiments of the present disclosure, a touch method is provided, applicable to the display module according to the first aspect. Referring to FIG. 11, it illustrates a flow chart of the touch method, including block S1101 to block S1103.

In block S1101, a touch position is obtained.

The display module has a touch sensor, and in this block, at least one touch position is obtained through the touch sensor.

In block S1102, at least one group of pixel circuits corresponding to the touch position is controlled to be connected to the signal reading mechanism.

The pixel circuits may be controlled in the following method of: firstly, obtaining a mapping relation between the touch position and the zone, in which each touch position in the mapping relation corresponds to at least one zone; and controlling a multi-column pixel circuit corresponding to at least one zone to be connected to the signal reading mechanism according to the obtained touch position and the mapping relation.

In an embodiment, corresponding to the touch zone illustrated in FIG. 5, when the touch position is in the Zone 1, the multi-column pixel circuits corresponding to the first zone and the second zone are connected to the signal reading mechanism. When the touch position is in the Zone 2, the multi-column pixel circuits corresponding to the second zone and the third zone are connected to the signal reading mechanism. Since the touch zones of Zone 1 and Zone 2 have an overlap zone, no matter where the user touches the display module, the fingerprint signal collection can be completed by selecting one of the first state and the second state in which the fingerprint collection mechanism is operated, so as to avoid the situation where the fingerprint signal collection can be completed only when the fingerprint collection mechanism is enabled to be in two states corresponding to the two touch zones in turn if the touch position spans across two non-overlap touch zones (e.g., the distribution mode illustrated in FIG. 8), which improves the efficiency and accuracy of the collection of fingerprint signals. Similarly, since the touch zones of Zone 1 and Zone 2 have the overlap zone, a touch zone responsible for response may be determined according to the user's touch position (that is, the state of the fingerprint collection mechanism is determined) in the following way: the display module is equally divided into two parts (i.e., the left part and the right part), that is, an invisible boundary line is set in a center of the display module, in which the left to the boundary line is one part and the right to the boundary line is the other part; when the user's touch position is in the left part, Zone 1 is determined as the zone responsible for the response, that is, the state of the fingerprint collection mechanism is determined to be in the first state; when the user's touch position is in the right part, Zone 2 is determined as the zone responsible for the response, that is, the state of the fingerprint collection mechanism is determined to be in the second state; when the user's touch position spans across the above boundary line, Zone 1 or Zone 2 can be randomly determined as the zone responsible for the response, and the fingerprint collection mechanism can be also determined to be in the corresponding state, or a default response zone at this situation can be set, that is, Zone 1 or Zone 2 is set as the default response zone, then the default response zone is determined as the zone responsible for the response at this time, and the fingerprint collection organization is determined to be in the corresponding state. The touch zone responsible for the response can also be determined in the following way, including: setting the priority of Zone 1 and Zone 2, and determining the touch zone responsible for the response according to the touch position. When the touch position is covered by the touch zone with a high priority, then the response may be made for the touch zone and the fingerprint collection mechanism may be determined to be in the corresponding state. When the touch position is not covered by the touch zone with the high priority, then the response may be made for the touch zone with a low priority and the fingerprint collection mechanism may be determined to be in the corresponding state.

In an embodiment, corresponding to the touch zone illustrated in FIG. 7, when there are two touch positions, and they are the fingerprint positions illustrated in the figure, the multi-column pixel circuits corresponding to the first partition in the fourth zone and the fourth partition in the sixth zone are connected to the signal reading mechanism, then the fingerprint collection problem for two-finger touches can be solved; when there is one touch position (that is, the left fingerprint position as illustrated in FIG. 7), the multi-column pixel circuits corresponding to the first partition and the fifth zone are connected to the signal reading mechanism; and when there is one touch position (that is, the fingerprint position on the right illustrated in FIG. 7), the multi-column pixel circuits corresponding to the fifth zone and the fourth partition are connected to the signal reading mechanism.

In an embodiment, corresponding to the touch zone illustrated in FIG. 8, when the touch position is in the Zone 1, the multi-column pixel circuit corresponding to the seventh zone are connected to the signal reading mechanism. When the touch position is in the Zone 2, the multi-column pixel circuit corresponding to the eighth zone are connected to the signal reading mechanism.

In block S1103, the signal reading mechanism is controlled to read fingerprint signals collected by the at least one group of pixel circuits connected to the signal reading mechanism.

Each signal reading unit reads the fingerprint signals collected by the corresponding column of pixel circuits (specifically one of the columns), and transmits the fingerprint signals to the digital-to-analog converter to be converted into digital signals. Then the digital signals are transmitted to the timer control register.

Figure 12:
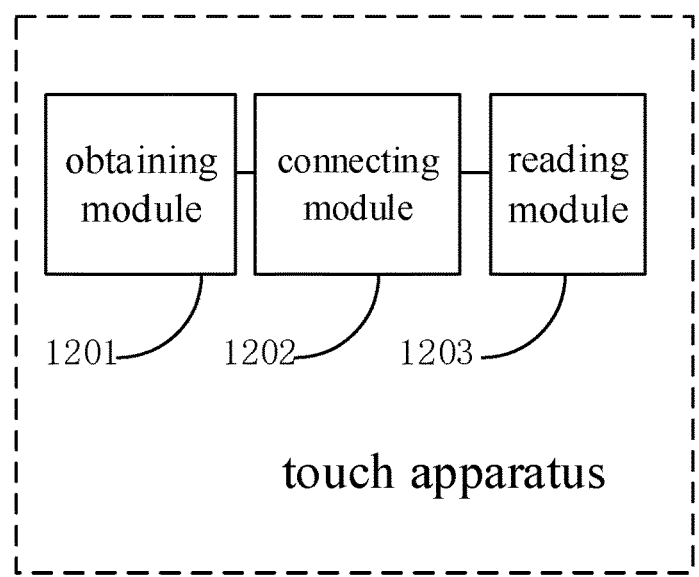
FIG. 12 is a structural schematic diagram illustrating a touch apparatus according to an exemplary embodiment.

According to a third aspect of embodiments of the present disclosure, a touch apparatus applicable to the display module according to the first aspect is provided. Referring to FIG. 12, it illustrates a schematic diagram of the touch apparatus. The touch apparatus includes an obtaining module 1201, a connecting module 1202 and a reading module 1203. The obtaining module is configured to obtain a touch position. The connecting module is configured to control at least one group of pixel circuits corresponding to the touch position to be connected to the signal reading mechanism. The reading module is configured to control the signal reading mechanism to read fingerprint signals collected by the at least one group of pixel circuits connected to the signal reading mechanism.

In an embodiment, the display module is provided with a touch sensor; the obtaining module is specifically configured to: obtain at least one touch position through the touch sensor.

In some embodiments of the present disclosure, the connecting module is specifically configured to: obtain a mapping relation between the touch position and the zone, in which each touch position in the mapping relation corresponds to at least one zone; and control a multi-column pixel circuit corresponding to at least one zone to be connected to the signal reading mechanism according to the obtained touch position and the mapping relation.

Regarding to the apparatus in the above embodiments, the specific operation manners in which each module performs has been described in detail in the embodiments of the method in the first aspect, and will not be elaborated here.

Figure 13:
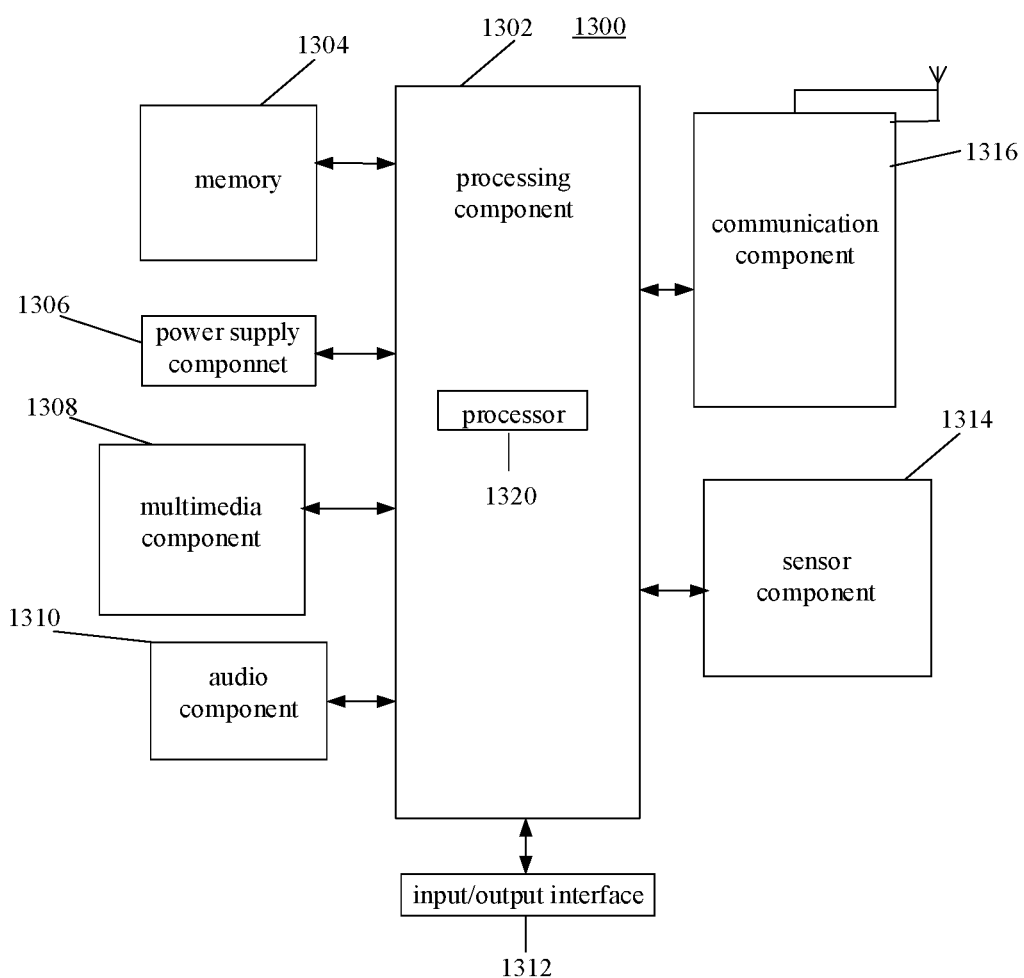
FIG. 13 is a block diagram illustrating an electronic device according to an exemplary embodiment.

According to a third aspect of the embodiments of the present disclosure, referring to FIG. 13, which exemplarily illustrates a block diagram of an electronic device. For example, the apparatus 1300 can be a mobile phone, a computer, a digital broadcasting terminal, a messaging device, a game console, a tablet device, a medical device, a fitness device, a personal digital assistant, etc.

Referring to FIG. 13, the apparatus 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 typically controls overall operations of the control apparatus 1300, such as the operations associated with display, telephone calls, data communications, camera operations, and recording operations. The processing component 1302 may include one or more processors 1320 to execute instructions to complete all or part of the steps of the aforementioned methods. In addition, the processing component 1302 may include one or more modules to facilitate the interaction between the processing component 1302 and other components. For example, the processing component 1302 may include a multimedia module to facilitate the interaction between the multimedia component 1308 and the processing component 1302.

The memory 1304 is configured to store various types of data to support operations on the apparatus 1300. Examples of these data include instructions for any application or method operating on the apparatus 1300, such as contact data, phone book data, messages, pictures, videos, and so on. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1306 provides power for various components of the apparatus 1300. The power component 1306 may include a power management system, one or more power supplies, and other components associated with the generation, management, and distribution of power for the apparatus 1300.

The multimedia component 1308 includes a screen that provides an output interface between the apparatus 1300 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and/or the rear camera may receive an external multimedia datum while the apparatus 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC). When the apparatus 1300 is in an operation mode, such as a call mode, a recording mode, and a voice recognition mode, the microphone is configured to receive external audio signals. The received audio signal may be further stored in the memory 1304 or transmitted via the communication component 1316. In some embodiments, the audio component 1310 further includes a speaker to output audio signals.

The I/O interface 1312 provides an interface between the processing component 1302 and the peripheral interface modules, such as a keyboard, a click wheel, buttons, and the like. These buttons may include but are not limited to: home button, volume button, start button, and lock button.

The sensor component 1314 includes one or more sensors to provide status assessments of various aspects of the apparatus 1300. For example, the sensor component 1314 may detect the on/off state of the apparatus 1300 and relative position of components, for example, components as the display and the keypad of the apparatus 1300. The sensor component 1314 may also detect changes of the position of the apparatus 1300 or one component of the apparatus 1300, and the presence or absence of contact between a user and the apparatus 1300, the position or acceleration/deceleration of the apparatus 1300, and the temperature change of the apparatus 1300. The sensor component 1314 may also include a proximity sensor configured to detect the presence of nearby objects without any physical contact. The sensor component 1314 may also include a light sensor, such as a CMOS or CCD image sensor for the imaging applications. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and other devices. The apparatus 1300 may get access to a wireless network based on the communication standard, such as Wi-Fi, 2G or 3G, 13G or 6G, or their combinations. In an exemplary embodiment, the communication component 1316 receives a broadcast signal or related information from an external broadcast management system through a broadcast channel. In one exemplary embodiment, the communication component 1316 further includes a near field communication (NFC) module to facilitate short-range communications. For example, the NFC module can be implemented based on Radio Frequency Identification (RFID) technology, Infrared Data Association (IrDA) technology, Ultra-Wide Band (UWB) technology, Blue Tooth (BT) technology and other technologies.

In an exemplary embodiment, the apparatus 1300 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for implementing the power supply method of the above electronic devices.

According to the fourth aspect, in embodiments of the present disclosure, there is also provided a non-transitory computer-readable storage medium including instructions, such as included in the memory 1304, executable by the processor 1320 in the apparatus 1300, for implementing the power supply method of the above electronic devices. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the present disclosure which follow the general principles thereof of the present disclosure and include common knowledge or conventional technical means in the technical field that are not disclosed by the present disclosure. The specification and the embodiments are to be considered as exemplary only, with a true scope and spirit of the present disclosure being indicated by the following claims.

It should be understood that the present disclosure is not limited to the precise structure described above and shown in the drawings, and various modifications and changes can be made without departing from its scope. The scope of the claimed invention is only limited by the appended claims.

What is claimed is:

1. A display module, applicable to a terminal, comprising:
   a signal reading mechanism;
   a fingerprint collection mechanism comprising a plurality of pixel circuits, wherein the plurality of pixel circuits are divided into a plurality of zones arranged adjacent to each other in a row direction, each of the zones comprises adjacent columns of pixel circuits in the row direction,
   a plurality of first switching units, each provided on a connection line between a column of pixel circuits and the signal reading mechanism; and
   a control mechanism connected to the first switching units and the signal reading mechanism respectively, wherein the control mechanism is configured to control zones of pixel circuits to be connected to the signal reading mechanism and control remaining zones of pixel circuits to be disconnected through the first switching units, and to control the signal reading mechanism to read fingerprint signals collected by the at least one zone of pixel circuits.

2. The display module of claim 1, wherein the signal reading mechanism comprises a plurality of signal reading units, each signal reading unit being connected to a common communication bus, each common communication bus being connected to at least one zone of pixel circuits; and
wherein the control mechanism is configured to control each common communication bus to be connected to a zone of pixel circuits through the first switching units, and to control the signal reading unit to read fingerprint signals collected by the zone of pixel circuits connected to the corresponding common communication bus.

3. The display module of claim 1, wherein the plurality of zones comprises a first zone, a second zone, and a third zone, each of the first zone, the second zone and the third zone corresponding to a multi-column pixel circuit; and
wherein the control mechanism is configured to control the pixel collection mechanism to be in a first state or a second state through the first switching units, wherein in the first state, the multi-column pixel circuits corresponding to the first zone and the second zone are connected to the signal reading mechanism and the multi-column pixel circuits corresponding to the third zone are disconnected to the signal reading mechanism, and in the second state, the multi-column pixel circuits corresponding to the second zone and the third zone are connected to the signal reading mechanism and the multi-column pixel circuits corresponding to the first zone are disconnected to the signal reading mechanism.

4. The display module of claim 3, wherein a column number of the multi-column pixel circuit corresponding to the second zone is greater than a column number of the multi-column pixel circuit corresponding to the first zone, and the column number of the multi-column pixel circuit corresponding to the first zone is equal to a column number of the multi-column pixel circuit corresponding to the third zone.

5. The display module of claim 1, wherein the plurality of zones comprises a fourth zone, a fifth zone, and a sixth zone, each of the fourth zone, the fifth zone and the sixth zone corresponding to a multi-column pixel circuit, the fourth zone comprising a first partition and a second partition arranged adjacent to each other in the row direction, and the sixth zone comprising a third partition and a fourth partition arranged adjacent to each other in the row direction; and
wherein the control mechanism is configured to control the pixel collection mechanism to be in a third state, a fourth state, or a fifth state through the first switching units, wherein in the third state, the multi-column pixel circuits corresponding to the first partition and the fourth partition are connected to the signal reading mechanism and the multi-column pixel circuits corresponding to the fifth zone are disconnected to the signal reading mechanism, in the fourth state, the multi-column pixel circuits corresponding to the first partition and the fifth zone are connected to the signal reading mechanism and the multi-column pixel circuits corresponding to the fourth partition are disconnected to the signal reading mechanism, and in the fifth state, the multi-column pixel circuits corresponding to the fifth zone and the fourth partition are connected to the signal reading mechanism and the multi-column pixel circuits corresponding to the first partition are disconnected to the signal reading mechanism.

6. The display module of claim 5, wherein a column number of the multi-column pixel circuit corresponding to the first partition is equal to a column number of the multi-column pixel circuit corresponding to the fifth zone, and the column number of the multi-column pixel circuit corresponding to the fifth zone is equal to a column number of the multi-column pixel circuit corresponding to the fourth partition.

7. The display module of claim 1, wherein the plurality of zones comprises a seventh zone and an eighth zone, each of the seventh zone and the eighth zone corresponding to a multi-column pixel circuit; and
wherein the control mechanism is configured to control a multi-column pixel circuit corresponding to the seventh zone or a multi-column pixel circuit corresponding to the eighth zone to be connected to the signal reading mechanism through the first switching units.

8. The display module of claim 1, further comprising a driving mechanism, wherein the driving mechanism comprises a plurality of driving units;
wherein the pixel circuit includes a photoelectric conversion unit and a second switching unit, the photoelectric conversion unit being connected to a bias voltage, and a first end and a second end of the second switching unit are respectively connected to the photoelectric conversion unit and the signal reading unit; and
wherein each of the driving units is connected to a third end of the second switching unit of a row of pixel units and configured to control the corresponding second switching unit to switch on or off.

9. A touch method, applicable to a display module including a signal reading mechanism and divided into a plurality of zones, comprising:
obtaining a touch position;
controlling zones of pixel circuits corresponding to the touch position to be connected to the signal reading mechanism and controlling remaining zones of pixel circuits to be disconnected to the signal reading mechanism through a plurality of first switching units; and
controlling the signal reading mechanism to read fingerprint signals collected by the zones of pixel circuits connected to the signal reading mechanism;
wherein the zones of pixel circuits are adjacent to each other in a row direction, each of the zones comprises adjacent columns of pixel circuits in the row direction, and each of the first switching units is provided on a connection line between each column of pixel circuits and the signal reading mechanism.

10. The method of claim 9, wherein the display module is provided with a touch sensor;
obtaining the touch position comprising:
obtaining at least one touch position through the touch sensor.

11. The method of claim 9, wherein controlling the zones of pixel circuits corresponding to the touch position to be connected to the signal reading mechanism comprises:
obtaining a mapping relation between the touch position and the zone, wherein each touch position in the mapping relation corresponds to the at least one zone; and
controlling a multi-column pixel circuit corresponding to the at least one zone to be connected to the signal reading mechanism according to the obtained touch position and the mapping relation.

12. The method of claim 9, wherein the signal reading mechanism comprises a plurality of signal reading units, each signal reading unit being connected to a common communication bus, each common communication bus being connected to the zones of pixel circuits;

wherein the method further comprises:
controlling each common communication bus to be connected to the zones of pixel circuits through the first switching units; and
controlling the signal reading unit to read fingerprint signals collected by the zones of pixel circuits.

13. A terminal, comprising:
a display module including a signal reading mechanism and divided into plurality of zones,
a processor, and
a memory configured to store computer instructions executable by the processor,
wherein the processor is configured to:
obtain a touch position;
control zones of pixel circuits corresponding to the touch position to be connected to the signal reading mechanism and control remaining zones of pixel circuits to be disconnected to the signal reading mechanism through a plurality of first switching units; and
control the signal reading mechanism to read fingerprint signals collected by the zones of pixel circuits connected to the signal reading mechanism;
wherein the zones of pixel circuits are adjacent to each other in a row direction, each of the zones comprises adjacent columns of pixel circuits in the row direction, and each of the first switching units is provided on a connection line between each column of pixel circuits and the signal reading mechanism.

14. The terminal of claim 13, wherein the display module is provided with a touch sensor, and the processor is further configured to obtain at least one touch position through the touch sensor.

15. The terminal of claim 13, wherein the processor is further configured to:
obtain a mapping relation between the touch position and the zone, wherein each touch position in the mapping relation corresponds to the at least one zone; and
control a multi-column pixel circuit corresponding to the at least one zone to be connected to the signal reading mechanism according to the obtained touch position and the mapping relation.

16. The terminal of claim 13, wherein the signal reading mechanism comprises a plurality of signal reading units, each signal reading unit being connected to a common communication bus, each common communication bus being connected to the at least one zone of pixel circuits;
wherein the processor is further configured to:
control each common communication bus to be connected to the zones of pixel circuits through the first switching units; and
control the signal reading unit to read fingerprint signals collected by the zones of pixel circuits.

\* \* \* \* \*